US009487261B2

(12) United States Patent
Tetsuka et al.

(10) Patent No.: US 9,487,261 B2
(45) Date of Patent: Nov. 8, 2016

(54) STRADDLE TYPE VEHICLE WITH LIQUID CRYSTAL DISPLAY DEVICE

(71) Applicant: HONDA MOTOR CO., LTD., Minato-Ku, Tokyo (JP)

(72) Inventors: Takashi Tetsuka, Wako (JP); Takeshi Kitajima, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 14/574,866

(22) Filed: Dec. 18, 2014

(65) Prior Publication Data

US 2015/0183481 A1 Jul. 2, 2015

(30) Foreign Application Priority Data

Dec. 27, 2013 (JP) ................ 2013-273254

(51) Int. Cl.
*G09G 3/36* (2006.01)
*B62J 99/00* (2009.01)
*B62H 5/00* (2006.01)
*G02F 1/133* (2006.01)
*G02F 1/1333* (2006.01)
(Continued)

(52) U.S. Cl.
CPC ............. *B62J 99/00* (2013.01); *B60K 37/02* (2013.01); *B62H 5/001* (2013.01); *B62H 5/20* (2013.01); *G02F 1/1336* (2013.01); *G02F 1/13306* (2013.01); *G02F 1/133382* (2013.01); *G09G 3/3406* (2013.01); *G09G 3/36* (2013.01); *B62J 2099/0026* (2013.01); *G02F 2001/133626* (2013.01); *G09G 2320/041* (2013.01); *G09G 2320/0626* (2013.01); *G09G 2330/045* (2013.01); *G09G 2380/10* (2013.01)

(58) Field of Classification Search
CPC . B62J 99/00; B62J 2099/0026; B62H 5/001; G02F 1/13306; G02F 1/1336; G02F 1/133382; G02F 2001/133626; G09G 3/3406; G09G 3/36; G09G 2380/10; G09G 2320/0626; G09G 2320/041
See application file for complete search history.

(56) References Cited

U.S. PATENT DOCUMENTS 7,136,043 B2 11/2006 Mori et al.
2004/0143373 A1* 7/2004 Ennis .................. B60R 1/00
                                                                701/1

(Continued)

FOREIGN PATENT DOCUMENTS

JP  2002-264871 A   9/2002
JP  2009116036 A *  5/2009

*Primary Examiner* — Kent Chang
*Assistant Examiner* — Mark Edwards
(74) *Attorney, Agent, or Firm* — Carrier Blackman & Associate, P.C.; Joseph P. Carrier; Jeffrey T. Gedeon

(57) ABSTRACT

A motorcycle includes liquid crystal display device with a liquid crystal panel and a back light source, a main controller which receives predetermined inputs pertaining to a current operating state of the vehicle or to a rider's intended operations of the vehicle, and a sub-controller for controlling the back light source. The sub-controller is configured to switch the back light source from a normal output state to a low output state if none of the predetermined inputs are inputted to the main controller for at least a predetermined time period, and to switch the back light source back to the normal output state if at least one of the predetermined inputs is inputted to the main controller when the back light source is in the low output state. The predetermined inputs correspond to the rider's operation of control members of the saddle type vehicle when riding.

18 Claims, 9 Drawing Sheets

(51) Int. Cl.
  *G02F 1/1335* (2006.01)
  *G09G 3/34* (2006.01)
  *B60K 37/02* (2006.01)
  *B62H 5/20* (2006.01)

(56) References Cited

U.S. PATENT DOCUMENTS

2004/0227646 A1* 11/2004 Henry ................. B60R 25/1004
　　　　　　　　　　　　　　　　　　　　　　　340/902
2008/0157605 A1* 7/2008 Bowden ................. B60K 37/06
　　　　　　　　　　　　　　　　　　　　　　　307/116
2008/0168957 A1* 7/2008 Neese .................... F02B 61/02
　　　　　　　　　　　　　　　　　　　　　　　123/54.4
2011/0125402 A1* 5/2011 Mitsugi .................. G01C 21/20
　　　　　　　　　　　　　　　　　　　　　　　701/532
2011/0254760 A1* 10/2011 Lloyd ...................... G01P 15/00
　　　　　　　　　　　　　　　　　　　　　　　345/156
2013/0302755 A1* 11/2013 Voorhees ............... G09B 19/16
　　　　　　　　　　　　　　　　　　　　　　　434/30
2014/0022390 A1* 1/2014 Blank ....................... B60R 1/12
　　　　　　　　　　　　　　　　　　　　　　　348/148

* cited by examiner

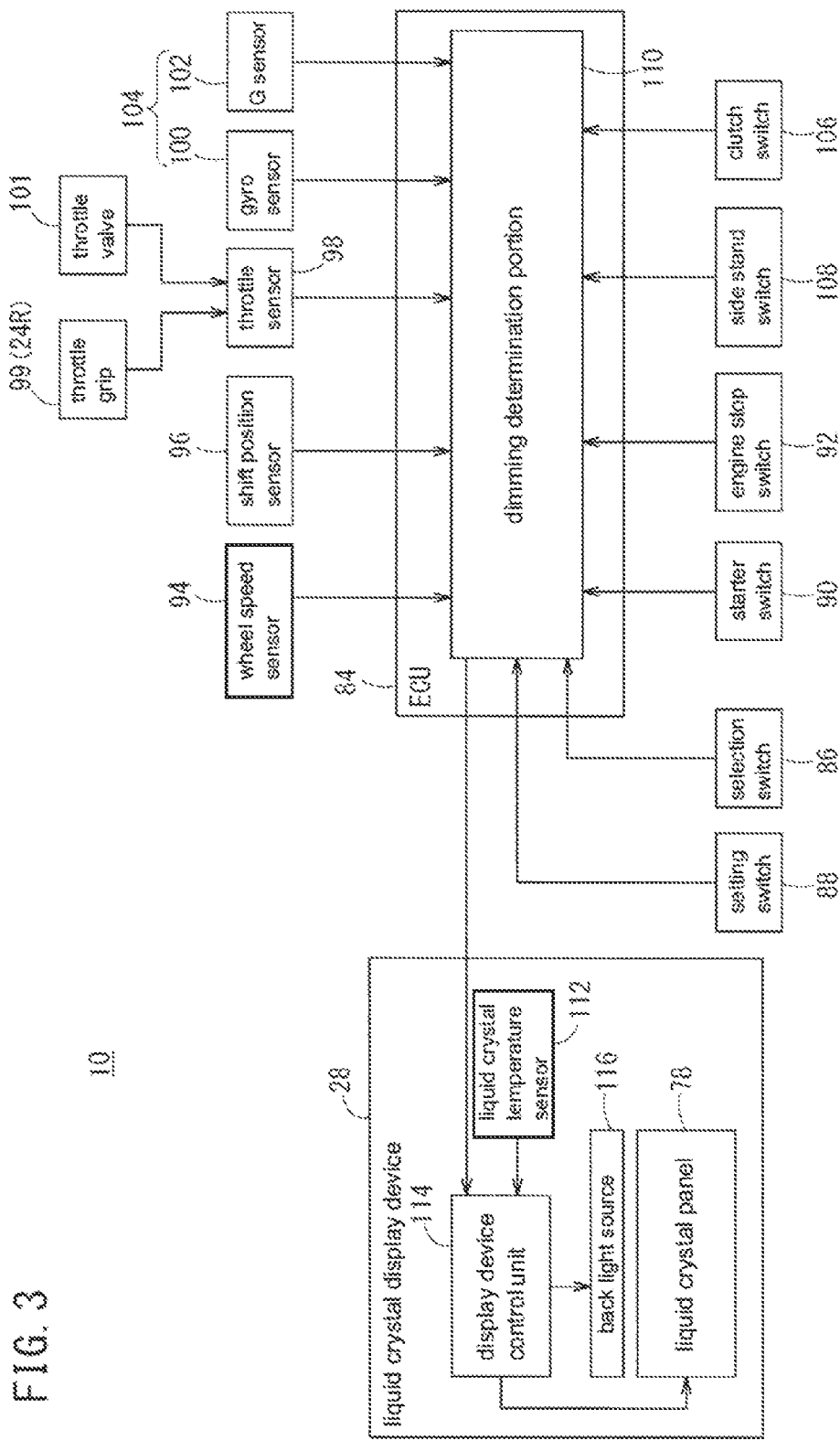

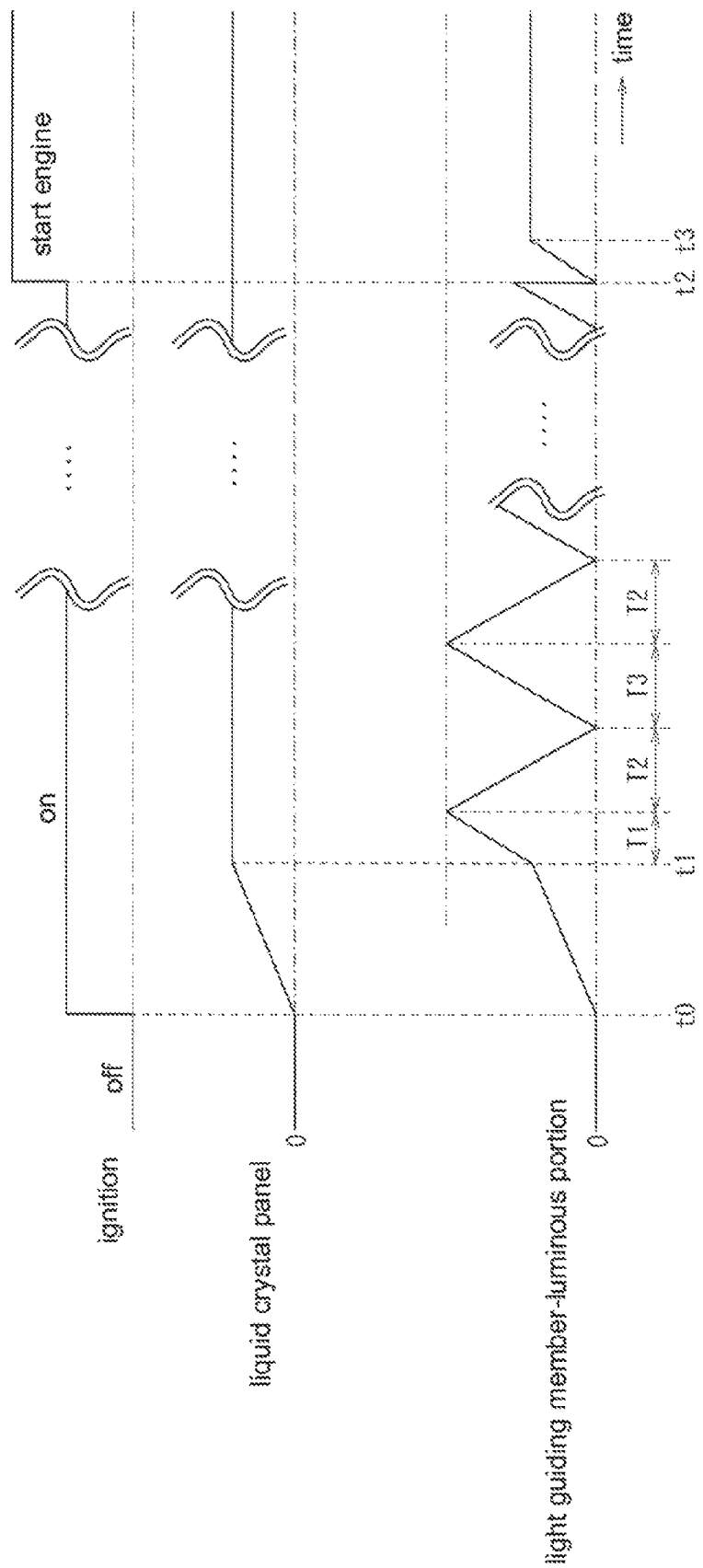

STRADDLE TYPE VEHICLE WITH LIQUID CRYSTAL DISPLAY DEVICE

CROSS-REFERENCE TO RELATED APPLICATIONS

The present invention claims priority under 35 USC 119 based on Japanese patent application No. 2013-273254, filed on Dec. 27, 2013. The entire subject matter of this priority document, including specification claims and drawings, is incorporated by reference herein.

BACKGROUND OF THE INVENTION

1. Technical Field of the Invention

The present invention relates to a straddle type vehicle having a liquid crystal display device that includes a liquid crystal panel and a back light source.

2. Background Art

Generally, in a case where a display such as a meter is exposed to the outside as in a straddle type vehicle, its temperature rises when exposed to direct sunlight, and thus measures need to be taken against the temperature rise.

For example, Japanese Patent Application Publication No. 2002-264871 (JP A 2002-264871) discloses a control method for a straddle type vehicle having a display that includes a liquid crystal panel, in which a drive voltage of the liquid crystal panel is adjusted on the basis of the temperature inside a display, which is detected by a temperature sensor, considering that contrast changes according to the temperature of liquid crystal.

Problem to be Solved by the Invention

Meanwhile, when a display including a liquid crystal panel is left exposed to direct sunlight while powered on, the temperature of the liquid crystal panel rises due to heat of the sunlight and heat from a back light source arranged on the rear side of a display surface of the liquid crystal panel. Consequently, heat resistance of the liquid crystal panel needs to be improved, which leads to a problem of extremely high cost.

SUMMARY OF THE INVENTION

Against this background, it is an object of the present invention to provide a straddle type vehicle, which is capable of suppressing both a temperature rise in a liquid crystal panel and power consumption of a liquid crystal display device. In the following discussion of characteristics of the invention, for ease of understanding reference numbers are provided which correspond to components of a present exemplary embodiment of the invention which is disclosed herein. Such reference numbers are not intended to, and do not, limit interpretation of the claims appended in the present application to such components of the present exemplary embodiment.

According to the present invention there is provided a straddle type vehicle (10) having a liquid crystal display device (28) including a liquid crystal panel (78) and a back light source (116) arranged on the rear side of a display surface (118) of the liquid crystal panel (78), and further having the following characteristics.

First Characteristic: The straddle type vehicle (10) further includes: a main controller (84) which receives predetermined inputs (24R, 44, 81, 86, 88, 90, 92, 99, 107) pertaining to a current operating state of the vehicle or to a rider's intended operations of the vehicle; and sub-controller (114) which controls the liquid crystal panel (78) and the back light source (116). The sub-controller (114) is configured to switch the back light source (116) from a normal output state to a low output state if none of the predetermined inputs (24R, 44, 81, 86, 88, 90, 92, 99, 107) are inputted to the main controller (84) for at least a predetermined time period, and to switch the back light source (116) back to the normal output state if at least one of the predetermined inputs (24R, 44, 81, 86, 88, 90, 92, 99, 107) is inputted to the main controller (84) when the back light source (116) is in the low output state. The predetermined inputs (24R, 44, 81, 86, 88, 90, 92, 99, 107) are effected by the rider when riding the straddle type vehicle (10).

Second Characteristic: The predetermined inputs (24R, 44, 81, 86, 88, 90, 92, 99, 107) are directly related to display contents of the display surface (118) of the liquid crystal panel (78).

Third Characteristic: The straddle type vehicle (10) further includes an acceleration sensor (104) and the sub-controller (114) is also configured to resume output of the back light source (116), if an acceleration change of not less than a predetermined value is inputted to the acceleration sensor (104) when the back light source (116) is in the low output state.

Fourth Characteristic: The sub-controller (114) is also configured to resume the normal output state of the back light source (116), if the acceleration sensor (104) detects at least acceleration in the crosswise direction or rotational acceleration in the roll axis direction of the straddle type vehicle (10) when the back light source (116) is in the low output state.

Fifth Characteristic: The straddle type vehicle (10) further includes a prime mover (32) having a main shaft (30) disposed in the vehicle width direction.

Sixth Characteristic: The acceleration sensor (104) is an acceleration sensor used for theft prevention or slip ratio control of the straddle type vehicle (10).

Seventh Characteristic: The liquid crystal display device (28) further includes a liquid crystal temperature sensor (112) which detects a temperature of the liquid crystal display panel (78), and the sub-controller is also configured to switch the back light source (116) from the normal output state to the low output state if the detected temperature of the liquid crystal display panel (78) is not less than a predetermined value.

Advantageous Effects of the Invention

According to the first characteristic of the present invention, the back light source is switched to a low output state if the main controller does not receive any of the predetermined inputs pertaining to a current operating state of the vehicle or to a rider's intended operations of the vehicle for at least a predetermined time period, and on the other hand, the back light source is switched back to its normal output state if the main controller receives one of the predetermined inputs pertaining to a current operating state of the vehicle or to a rider's intended operations of the vehicle when the back light source is in the low output state. This configuration can desirably suppress both a temperature rise in the liquid crystal panel and power consumption of the liquid crystal display device. Additionally, since switching of the back light source between its normal and low output states is automatically effected based on the predetermined (normal) inputs to the main controller there is no need for a separate, dedicated controller, and the rider is not required to search for a specific controller to effect switching of the back light source between its normal and low output states. Moreover, the rider's intention on riding the straddle type vehicle can be implicitly understood based on the predetermined inputs to the main controller resulting from the rider's operation of certain (manual) control components, and thus output of the back light source can be resumed promptly at an appropriate timing.

According to the second characteristic of the present invention, the rider rarely checks the display contents of the display surface of the liquid crystal panel when he/she operates a controller that is not directly related to the display contents. Hence, the back light source is maintained in the low output state in such a case, so that power consumption and heat generation in the liquid crystal display device can be suppressed effectively.

According to the third characteristic of the present invention, by detecting changes in acceleration such as a posture change of the vehicle body when the rider mounts the straddle type vehicle, the rider's intention on riding the straddle type vehicle can also be detected. Thus, output of the back light source can be resumed promptly without requiring the rider's operation of a control component.

According to the fourth characteristic of the present invention, when the rider mounts a straddle type vehicle, in many cases, he/she mounts it from the side. For this reason, the rider's intention can be detected efficiently by detecting at least acceleration in the lateral direction.

According to the fifth characteristic of the present invention, a prime mover is likely to vibrate in the radial direction of its main shaft when the main shaft rotates, and on the other hand, is not likely to vibrate in the longitudinal direction of the main shaft. Accordingly, by arranging the main shaft of the prime mover in the vehicle width direction of the straddle type vehicle, the detection threshold of acceleration in the crosswise direction and of rotational acceleration in the roll axis direction detected by the acceleration sensor can be lowered. As a result, sensitivity of the acceleration sensor can be improved.

According to the sixth characteristic of the present invention, employing an acceleration sensor already used for theft prevention or slip ratio control of the straddle type vehicle eliminates the need for a separate, dedicated acceleration sensor, for resuming output of the back light source.

According to the seventh characteristic of the present invention, the sub-controller can switch the back light source from the normal output state to the low output state if the detected temperature of the liquid crystal display panel is not less than a predetermined value, for thereby avoiding unnecessary delay in operating the liquid crystal display at an appropriate output state.

BRIEF DESCRIPTION OF THE DRAWINGS

FIG. 3 is a block diagram of the motorcycle of FIG. 1 including components related to control of the liquid crystal display device.

FIG. 9 is a timing chart showing operations of a motorcycle including the liquid crystal display device of FIG. 8.

DETAILED DESCRIPTION OF THE INVENTION INCLUDING BEST MODE

Hereinbelow, a detailed description will be given of present exemplary embodiments of a straddle type vehicle according to the present invention with reference to the accompanying drawings.

Figure 1:
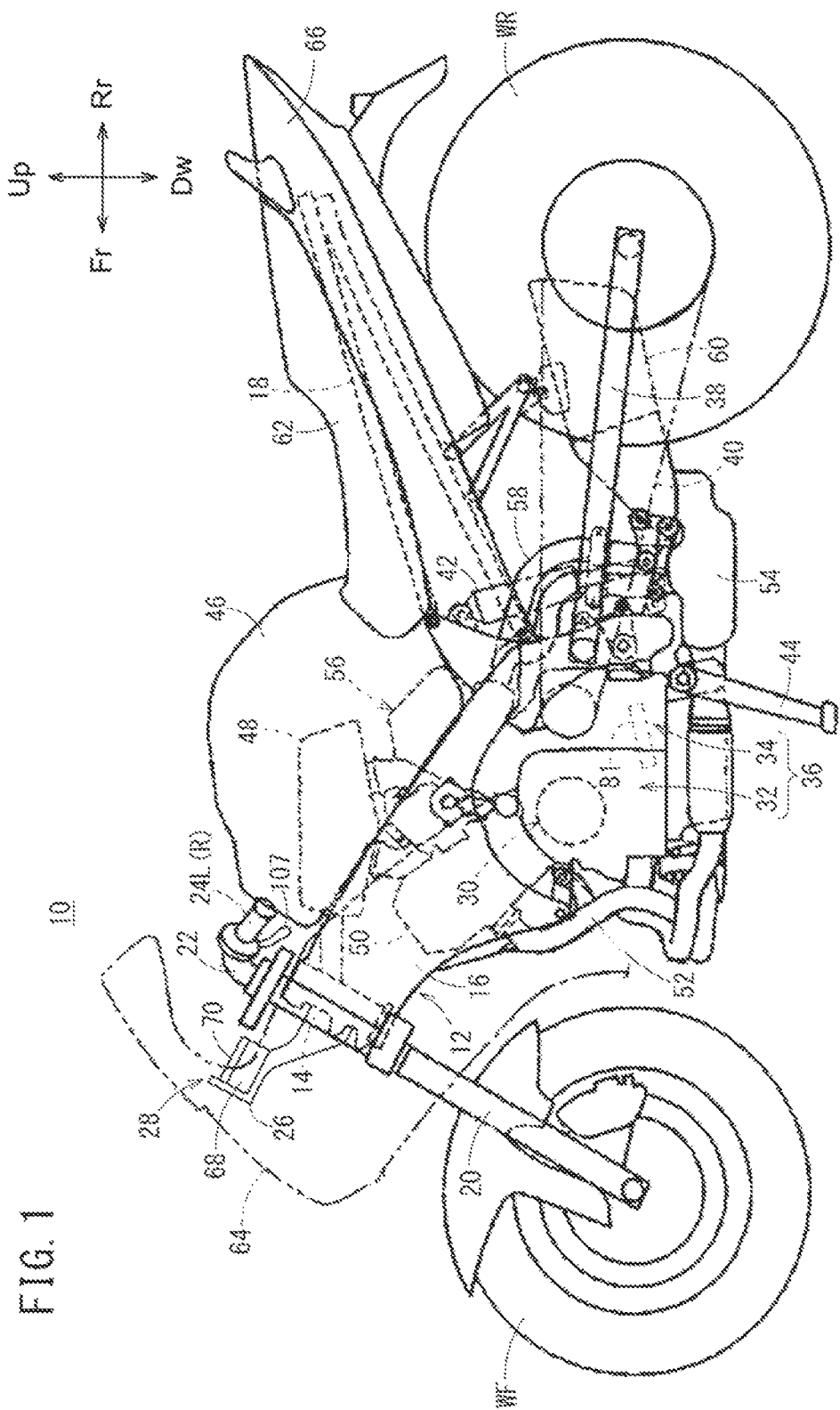
FIG. 1 is an external left side view of a motorcycle having a liquid crystal display device according to an exemplary embodiment of the present invention.

FIG. 1 is an external left side view of a motorcycle 10 as a straddle type vehicle according to the embodiment. Note that the front and rear, left and right, and upper and lower directions of the motorcycle 10 are described on the basis of directions seen from a rider mounting the motorcycle 10, if not stated otherwise.

A body frame 12 of the motorcycle 10 has a head pipe 14, a main frame 16 extending downward in the rear direction from the head pipe 14, and a seat frame 18 extending upward in the rear direction from around a rear portion of the main frame 16. The head pipe 14 pivotally and rotatably supports a front fork 20, which rotatably supports a front wheel WF as a steered wheel.

A handle bar 22 is attached to a top portion of the front fork 20, and handle grips 24L, 24R are provided on the left and right of the handle bar 22. The rider can steer the front wheel WF by gripping the left and right handle grips 24L, 24R and steering.

A liquid crystal display device 28 as a meter unit is arranged in front of the handle bar 22 through a bracket 26, above the head pipe 14.

A power unit 36 including a transmission 34 and a V4 engine 32 having its crankshaft 30 disposed in the vehicle width direction, which is the crosswise direction, is attached to a lower portion of the main frame 16. Power outputted from the crankshaft 30, which is the main shaft of the engine 32, is transmitted to a rear wheel WR as a driving wheel through the transmission 34.

A swing arm 38 pivotally and rotatably supporting the rear wheel WR is swingably supported by a rear lower portion of the main frame 16. A driving force of the engine 32 outputted through the transmission 34 is transmitted to the rear wheel WR as the driving wheel through a drive chain 40. The swing arm 38 is suspended from a rear upper portion of the main frame 16 by a rear cushion unit 42. A side stand 44 that supports the vehicle body when the vehicle is parked is attached to a rear bottom end portion of the main frame 16 on its left side.

A fuel tank 46 and an air cleaner box 48 are provided in upper portions of the main frame 16. Exhaust gas from a front cylinder 50 of the engine 32 is transmitted to an expansion chamber 54 through a front exhaust pipe 52. Exhaust gas from a rear cylinder 56 of the engine 32 is transmitted to the expansion chamber 54 through a rear exhaust pipe 58. The exhaust gas transmitted to the expansion chamber 54 is discharged to the rear of the vehicle through a muffler 60.

A seat 62 on which the rider sits is provided above the seat frame 18. A front cowl 64 covering the front of the vehicle is provided in front of the head pipe 14 and the liquid crystal display device 28, while a rear cowl 66 covering the sides and rear of the vehicle is provided in side and rear portions of the seat frame 18.

Figure 2:
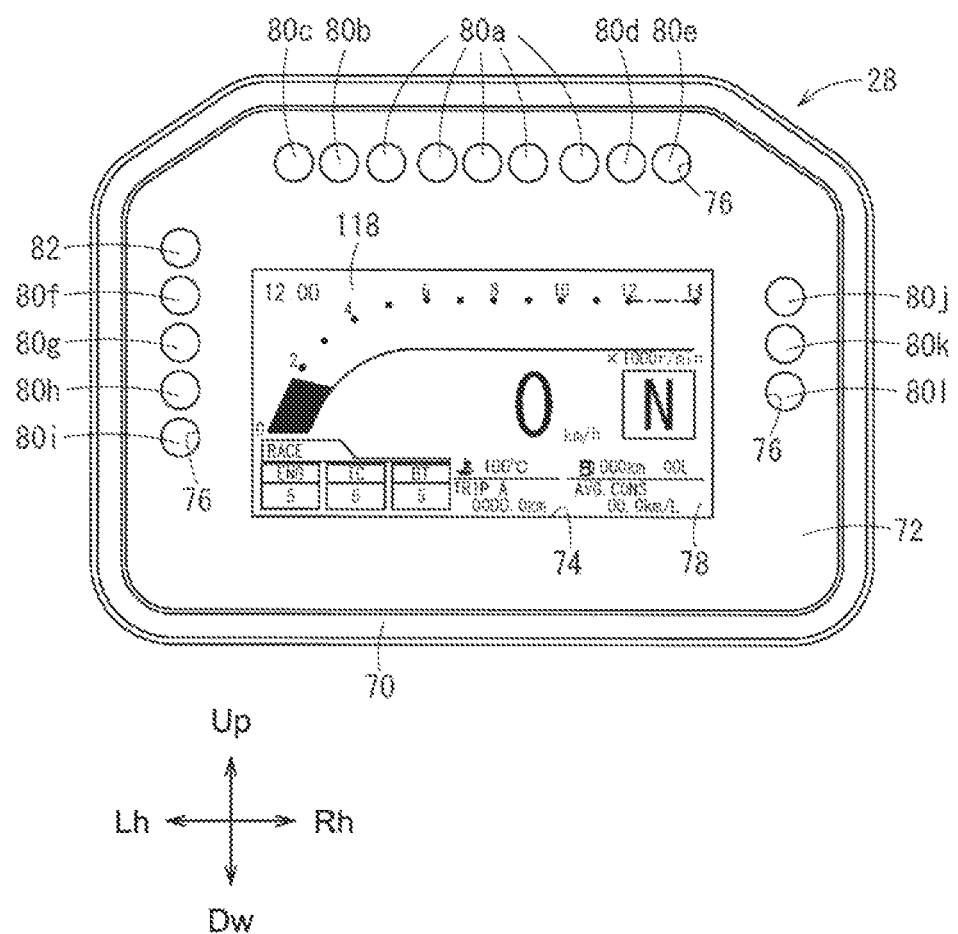
FIG. 2 is a front view of the liquid crystal display device of the motorcycle of FIG. 1.

FIG. 2 is a front view of the liquid crystal display device 28 as seen from the rider sitting on the seat 62.

The liquid crystal display device 28 has a structure in which a bottomed cylindrical housing 68 mounted on the bracket 26 of FIG. 1 is covered with a cover member 70. A lens 72 whose rear face is colored in black, for example, is fitted to the inside of the cover member 70. A rectangular opening 74 is formed in a center portion of the lens 72, and multiple hole portions 76 are formed around the opening 74.

In this case, when the rider looks at the liquid crystal display device 28, a liquid crystal panel 78 is viewed through the opening 74, while multiple LEDs 80a to 80l and a photo sensor 82 are viewed through the respective hole portions 76.

Various information such as the vehicle speed of the motorcycle 10 is displayed on the liquid crystal panel 78. In this case, display contents of the liquid crystal panel 78 refer to various information related to states of the motorcycle 10, controlled by predetermined control elements or members included in the motorcycle 10, and which are operated by the rider of the motorcycle. Specific contents will be described later.

Of the nine LEDs 80a to 80e on the upper side of the liquid crystal panel 78, the center five LEDs 80a are shift up indicators that are lit at the same time to instruct the rider to press on a shift pedal 81 for shifting up the shift position. On the left, the LED 80b is lit when traction control is on, and the LED 80c is lit when traction control is off. Meanwhile, on the right, the LED 80d is lit to warn that the temperature of cooling water is high, and the LED 80e is lit for notification that authentication process requiring an FOB key, which is a portable device of an electronic key system applied to the motorcycle 10, cannot be carried out since the rider does not carry the FOB key.

Of the four LEDs 80f to 80i on the left side of the liquid crystal panel 78, the LED 80f is lit when the motorcycle 10 is turning left. The LED 80g is lit for notification that there is only a small amount of fuel left in the fuel tank 46. The LED 80h is lit when the headlight is switched to high beam. The LED 80i is lit for notification that the FOB key is authenticated.

Of the three LEDs 80j to 80l on the right side of the liquid crystal panel 78, the LED 80j is lit when the motorcycle 10 is turning right. The LED 80k is lit when an electronically controlled steering damper is in operation. The LED 80l is lit when the shift position is neutral.

The photo sensor 82 is a sensor for detecting light around the liquid crystal display device 28 such as sunlight.

FIG. 3 is a block diagram of the motorcycle 10 related to display control of the liquid crystal panel 78.

The motorcycle 10 further includes an ECU or main controller 84 for controlling the power unit 36 and the like. Various switches and sensors are provided in the motorcycle 10, and output signals from the switches and detection signals from the sensors are inputted to the ECU 84.

To be specific, the motorcycle 10 is provided with: a selection switch 86, a setting switch 88, a starter switch 90; an engine stop switch 92, a wheel speed sensor 94, a shift position sensor 96, a throttle sensor 98, an acceleration sensor 104 including a gyro sensor 100 and a G sensor 102 and used for theft prevention or slip ratio control of the motorcycle 10, a clutch switch 106, and a side stand switch 108. Note that slip ratio control refers to ABS (anti-lock braking system), TCS (traction control system), and the like.

The selection switch 86 and the setting switch 88 are control members through which the rider can effect certain controls, and are provided separately from the liquid crystal display device 28. In this case, the selection switch 86 can switch display contents of the liquid crystal panel 78 according to the rider's operation, and outputs a switch request signal instructing switching of the display contents to the ECU 84. According to the rider's operation, the setting switch 88 sets the display content of the liquid crystal display device 78 switched by the selection switch 86, and outputs a setting request signal instructing setting of the display content to the ECU 84.

The starter switch 90 is a control member for starting the engine 32 according to the rider's operation when an unillustrated ignition switch is on and the shift position is neutral, and outputs a start instruction signal instructing start of the engine 32 to the ECU 84. Note that when the ignition switch is turned on, electric power supply to the liquid crystal display device 28, the ECU 84, and the like from an unillustrated battery is started, so that the liquid crystal display device 28 and the ECU 84 can be started.

The engine stop switch 92 is a control member for stopping the engine 32 according to the rider's operation, and outputs a stop instruction signal instructing stop of the engine 32 to the ECU 84.

The wheel speed sensor 94 detects the vehicle speed of the motorcycle 10 and outputs it to the ECU 84.

The shift position sensor 96 detects a shift position to which the rider shifts up or shifts down by operating the shift pedal 81 as a controller, and outputs it to the ECU 84. Note that a hand-operated shift switch or the like may be provided instead of the shift pedal 81, and a shift position to which the rider operates the shift switch may be detected.

The throttle sensor 98 is either a grip position sensor detecting the rider's operation amount of the right handle grip 24R as a throttle grip 99 which is a control member, or a throttle position sensor detecting an actual opening of a throttle valve 101 based on the operation amount. Hence, the throttle sensor 98 outputs a detection signal depending on the detected operation amount or actual opening to the ECU 84.

The gyro sensor 100 is a three-dimensional acceleration sensor detecting angular acceleration, which is rotational acceleration in the roll axis direction, the pitch axis direction, and the yaw axis direction of the motorcycle 10, and outputting it to the ECU 84. Specifically, the gyro sensor 100 detects a posture change of the motorcycle 10 around its longitudinal axis as rotational acceleration in the roll axis direction, a posture change around the vehicle width axis as rotational acceleration in the pitch axis direction, and rotational movement around the vertical axis as rotational acceleration in the yaw axis direction.

The G sensor 102 is a three-axis acceleration sensor detecting acceleration in the longitudinal direction, the width direction, which is the crosswise direction, and the vertical direction, and outputting it to the ECU 84.

Accordingly, the acceleration sensor 104 configured of the gyro sensor 100 and the G sensor 102 is a six-axis compound sensor detecting acceleration of the motorcycle 10 in roll, yaw, pitch, straight, which is translational, width, and vertical directions, and outputting it to the ECU 84.

When the rider operates a clutch lever 107 as a control member provided in the vicinity of the left handle grip 24L and the clutch lever 107 swings for a predetermined angle, the clutch switch 106 determines that the rider has disengaged the clutch and outputs a detection signal to the ECU 84.

When the side stand 44 as a control member is moved up in a predetermined storing position, the side stand switch 108 outputs a detection signal to the ECU 84.

Thus, in the exemplary embodiment, results of the rider's operation of the above-mentioned throttle grip 99, shift pedal 81, selection switch 86, setting switch 88, starter switch 90, engine stop switch 92, clutch lever 107, and side stand 44 as control members of the motorcycle 10, or detection signals transmitted from the sensors in response to the operation results are inputted to the ECU 84.

Note that in the exemplary embodiment, operation results of the rider's operation of respective control members for a front brake switch and a rear brake switch may also be inputted to the ECU 84.

Alternatively, a detection signal from each sensor, which detects an operation result of the rider's operation of a brake lever or a brake pedal as a control member, may be inputted to the ECU 84. In this case, a stop lamp switch outputs an output signal indicating lighting of a stop lamp to the ECU 84, when lighting the stop lamp in response to the rider's operation of the brake lever or the brake pedal.

In addition, in the exemplary embodiment, operation results of the rider's operation of control members such as a winker switch and a dimmer switch may be inputted to the ECU 84. In this case, the winker switch outputs the rider's operation result to the ECU 84 when the rider operates the winker switch to light a winker lamp. Meanwhile, the dimmer switch outputs the rider's operation result to the ECU 84 when the rider operates the dimmer switch to switch the headlight to high beam or low beam.

Then, in the exemplary embodiment, the above-mentioned operation results of the control members operated by the rider and detection signals from the sensors are inputted to a dimming determination portion 110 provided as a part of the ECU 84, which dimming determination portion 110 then sends appropriate control signals to the liquid crystal display device 28, and specifically to a display device control unit or sub-controller 114 within the liquid crystal display device 28.

Depending on the aforementioned operation results or whether or not a detection signal is inputted to the ECU 84, for example, the dimming determination portion 110 determines whether to keep the brightness of the liquid crystal display device 28 in a normal display state having a normal luminance where display contents such as characters and figures can be viewed satisfactorily when the rider views the liquid crystal panel 78, or to change to a dimmed display state dimmed from the normal display state. If the dimming determination portion 110 determines to change to the dimmed display state, it outputs a dimming signal instructing display of the dimmed display state to the liquid crystal display device 28. Note that details of determination processes by the dimming determination portion 110 will be described later.

Additionally, since some of the switches and sensors, such as the wheel speed sensor 94, output detection signals to the ECU 84 at predetermined time intervals, the dimming determination portion 110 performs the determination processes regarding whether or not to output the dimming signal at predetermined time intervals. Hence, once the dimming determination portion 110 outputs the dimming signal to the liquid crystal display device 28, it continues to output dimming signals to the liquid crystal display device 28 until it determines to resume the normal display state.

Note that since the dimming determination portion 110 also receives input of signals from the stop lamp switch, the clutch switch 106, the side stand switch 108, the winker switch, and the dimmer switch, it may also determine whether or not to output the dimming signal by use of these signals. Note, however, that since these signals do not directly affect display contents of the liquid crystal panel 78 to be described later, the following description is given on the assumption that the dimming determination portion 110 does not use these signals in the determination processes of the dimming signal.

In addition, the dimming determination portion 110 determines whether or not to output the dimming signal based not on the engine speed, but on the operation amount of the throttle grip 99 or the actual opening of the throttle valve 101 that relates to changes in the engine speed. Specifically, the determination process of the dimming signal using the engine speed may not be precise, since the engine speed sometimes changes without the rider's operation of the control member, such as during idling of the motorcycle 10. For this reason, the dimming determination portion 110 performs the determination process of the dimming signal not by use of the engine speed, but by use of the operation amount of the throttle grip 99 or the actual opening of the throttle valve 101 that relates to the engine speed and is consciously operated by the rider.

Note that since the ECU 84 receives input of the operation results of the control members and the detection signals from the sensors in the embodiment as mentioned before, it may control not only the liquid crystal display device 28, but also other parts of the motorcycle 10 according to the inputted operation results and detection signals, as a matter of course. For example, when the ECU 84 receives input of a start instruction signal from the starter switch 90, it starts the engine 32. When the ECU 84 receives input of a stop instruction signal from the engine stop switch 92, it stops the engine 32.

In addition to the liquid crystal panel 78, the liquid crystal display device 28 also has a liquid crystal temperature sensor 112, the display device control unit or sub-controller 114, and a back light source 116. The liquid crystal panel 78, the liquid crystal temperature sensor 112, the display device control unit 114, and the back light source 116 are accommodated inside the housing 68.

The liquid crystal temperature sensor 112 detects the temperature of the liquid crystal panel 78, and more specifically, the temperature of liquid crystal inside the liquid crystal panel 78, and outputs it to the display device control unit 114.

The display device control unit 114 controls the liquid crystal panel 78 and the back light source 116.

To be more precise, the back light source 116 is arranged on the rear side of a display surface 118 of the liquid crystal panel 78, and irradiates the liquid crystal panel 78 with back light to display the contents of the display surface 118 with a desired brightness. In this case, the display device control unit 114 adjusts the light amount of back light outputted from the back light source 116 by adjusting the amount of electric power supplied to the back light source 116, and can thereby vary the luminance of the display surface 118.

Additionally, when the temperature of liquid crystal detected by the liquid crystal temperature sensor 112 is not lower than a predetermined set value, or a dimming signal is inputted from the dimming determination portion 110, the display device control unit 114 lowers the luminance of the display surface 118 by switching the back light source 116 to a low output state to reduce the light amount of back light irradiated on the liquid crystal panel 78, and thereby switches the liquid crystal panel 78 to the dimmed display state from the normal display state.

On the other hand, when the temperature of liquid crystal is lower than the predetermined set value, or the inputting of dimming signals stops, the display device control unit 114 changes the light amount of back light back to that of the normal display state, and thereby switches the display surface 118 to the normal display state from the dimmed display state.

Figure 4A:
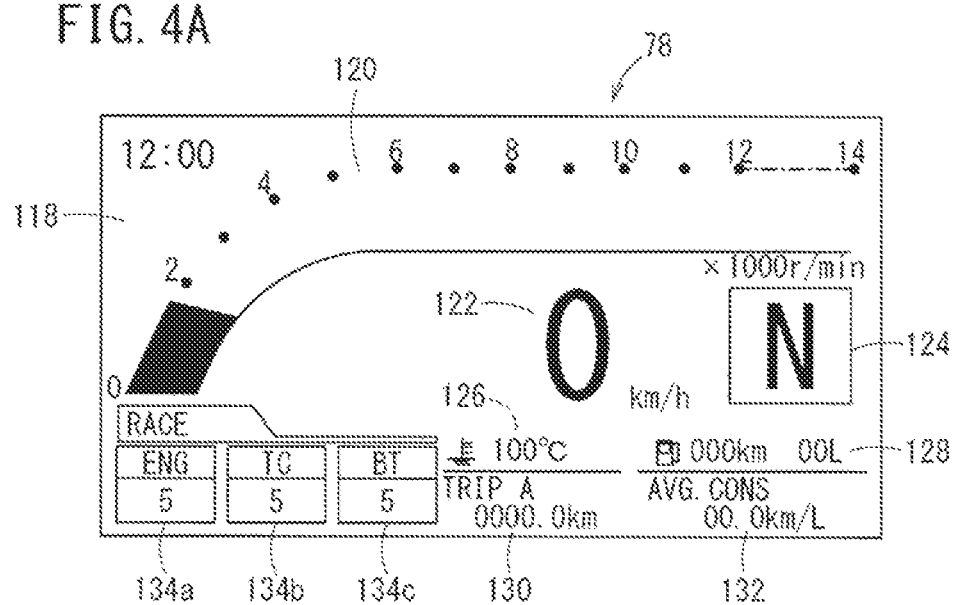
FIG. 4A is an explanatory view showing a normal display state of a display surface of the liquid crystal panel of FIG. 2.
Figure 4B:
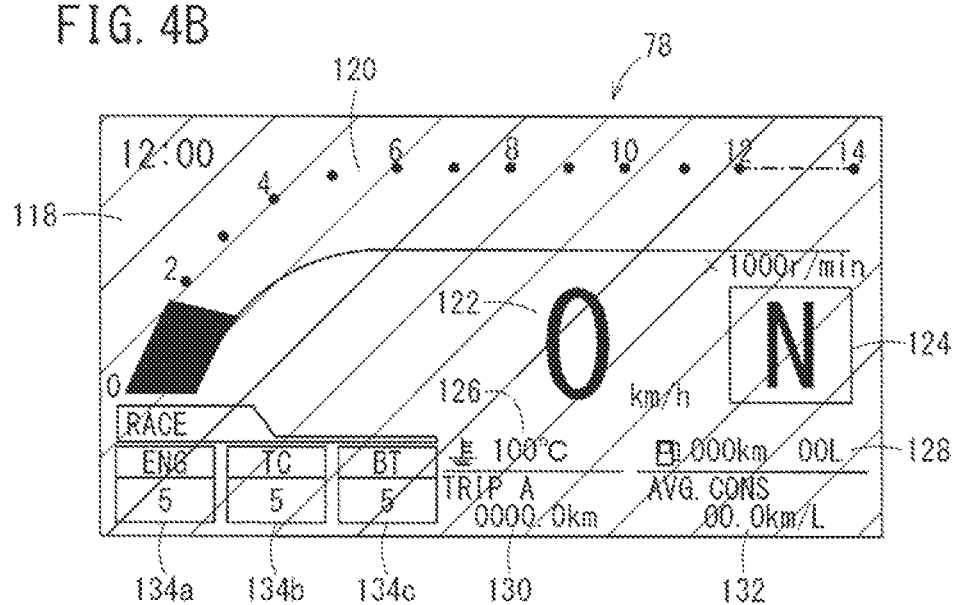
FIG. 4B is an explanatory view showing a dimmed display state of the display surface.

FIG. 4A shows a case where the display surface 118 is in the normal display state, and FIG. 4B shows a case where the display surface 118 is in the dimmed display state. Note that the display contents of the display surface 118 are displayed in black as an example in FIGS. 4A and 4B.

In FIG. 4A, a revolution indicator 120 indicating the engine revolutions of the motorcycle 10, a vehicle speed indicator 122 indicating the vehicle speed, a shift position indicator 124 indicating the shift position, a water temperature indicator 126 indicating the temperature of cooling water, a fuel indicator 128 indicating the remaining amount of fuel in the fuel tank 46 and the distance that the vehicle is capable of traveling, a distance indicator 130 indicating the travel distance, and a fuel consumption indicator 132 indicating the average fuel consumption are displayed on the display surface 118.

Additionally, output response indicators 134a to 134c indicating degrees of output responses of parts of the motorcycle 10 are also displayed on the display surface 118. In the normal display state in FIG. 4A, each display content is displayed in black, while the background portion is displayed in white.

To be specific, one of integers 1 to 10 is displayed as the degree of output response on each of the output response indicators 134a to 134c. In this case, a larger number indicates a larger output response to the rider's operation amount of the control member. The numerical value displayed on each of the output response indicators 134a to 134c is adjustable by the rider's operation of an unillustrated operation button or switch.

The output response indicator 134a indicates the degree of response of engine output to the rider's operation amount of the throttle grip 99, and a larger value indicates that engine output is more responsive to changes in the operation amount. In addition, the output response indicator 134b indicates the effectiveness of traction control, and a larger value indicates that traction control is performed even at a relatively lower slip ratio. Moreover, the output response indicator 134c indicates the effectiveness of back torque, and a larger value indicates that a larger engine brake is actuated.

Thus, display contents of the display surface 118 include those directly related to the control members of the motorcycle 10.

Specifically, the engine revolutions displayed on the revolution indicator 120, the vehicle speed displayed on the vehicle speed indicator 122, the temperature of cooling water displayed on the water temperature indicator 126, the remaining amount of fuel and the distance that the vehicle is capable of traveling displayed on the fuel indicator 128, the travel distance displayed on the distance indicator 130, the average fuel consumption displayed on the fuel consumption indicator 132, and the output response indicators 134a to 134c are display contents related to the throttle grip 99, the starter switch 90, and the engine stop switch 92. Additionally, the shift position displayed on the shift position indicator 124 is a display content related to the shift pedal 81.

Meanwhile, in the dimmed display state in FIG. 4B, the light amount of back light from the back light source 116 is reduced, such that the entire background portion of the display contents of the display surface 118 is dimmed, i.e., changed to a dark color having low optical transmittance, such as gray. In FIG. 4B, the background portion is indicated by diagonal lines.

Note that even when the display surface 118 is once shown in the dimmed display state as in FIG. 4B, if the temperature of liquid crystal becomes lower than the set value, or the inputting of dimming signals stops, the display surface 118 resumes its normal display state as in FIG. 4A, as mentioned earlier.

The motorcycle 10 of the embodiment is configured in the above-mentioned manner, and next, operations related to the normal or dimmed display state of the display surface 118 of the liquid crystal panel 78 will be described with reference to FIGS. 5 and 6. Note that the following description of operations will be given by also referring to FIGS. 1 to 4B as needed.

Figure 5:
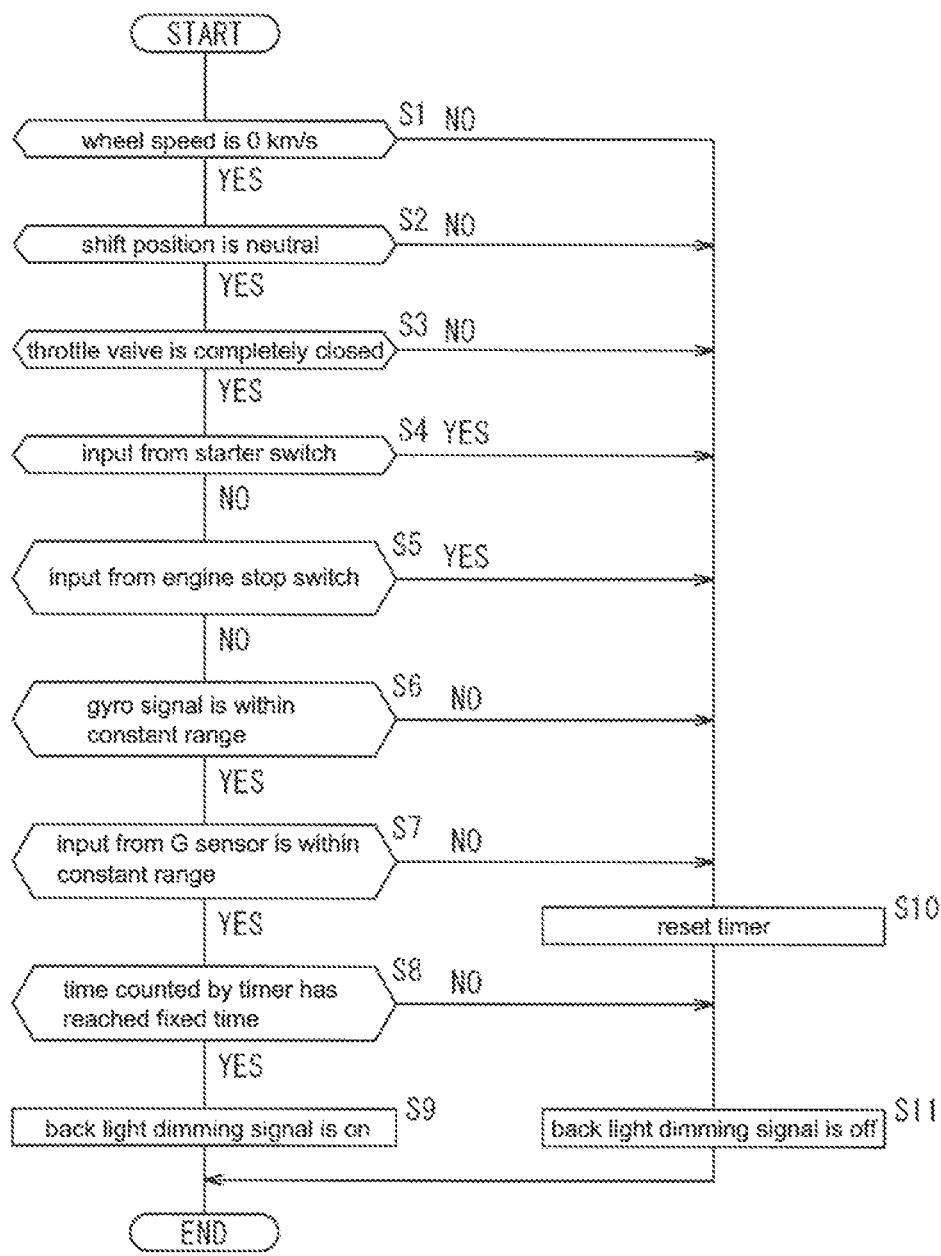
FIG. 5 is a flow chart showing operations of an ECU of FIG. 3 for controlling the output state of a back light of the liquid crystal display device.

FIG. 5 is a flow chart showing the determination processes of the dimming determination portion 110. Note that the determination processes are repeated at predetermined time intervals.

If the result is positive in the determination processes in steps S1 to S3 and S6 to S8, and negative in steps S4 and S5, the dimming determination portion 110 determines that the motorcycle 10 is left untouched under sunlight for not less than a fixed time period (such as for about several minutes) with its control members unoperated by the rider, and liquid crystal of the liquid crystal panel 78 may be damaged by heat caused by irradiation of sunlight as well as heat generated by the back light source 116 itself when outputting the back light. Then, in the next step S9, the dimming determination portion 110 outputs a dimming signal for reducing the light amount of back light outputted from the back light source 116.

The determination processes in steps S1 to S8 are as follows.

In step S1, the dimming determination portion 110 determines whether or not the vehicle speed of the motorcycle 10 detected by the wheel speed sensor 94 is 0 km/s, i.e., the motorcycle 10 is in a parked state.

In step S2, the dimming determination portion 110 determines whether or not the shift position detected by the shift position sensor 96 is neutral.

In step S3, the dimming determination portion 110 determines whether or not the operation amount of the throttle grip 99 or the actual opening of the throttle valve 101 detected by the throttle sensor 98 is 0, i.e., the throttle valve 101 is in a completely closed state.

In step S4, the dimming determination portion 110 determines whether or not there is an input from the starter switch 90. In step S5, the dimming determination portion 110 determines whether or not there is an input from the engine stop switch 92.

In step S6, the dimming determination portion 110 determines whether or not the rotational acceleration of the motorcycle 10 in the roll axis direction, the pitch axis direction, and the yaw axis direction detected by the gyro sensor 100 is within a constant range, i.e., whether or not levels of gyro signals indicating the detected rotational acceleration are within a constant range. In step S7, the dimming determination portion 110 determines whether or not acceleration of the motorcycle 10 in the longitudinal direction, the width direction, and the vertical direction detected by the G sensor 102 is within a constant range. Accordingly, in steps S6 and S7, the dimming determination portion 110 determines whether or not a posture change occurs in the vehicle body of the motorcycle 10.

Thus, in the determination processes in steps S1 to S7, the dimming determination portion 110 determines whether or not the motorcycle 10 is left untouched, based on results of the rider's operation of the control members and whether or not detection signals are inputted from the sensors.

In step S8, if the result is positive in the determination processes in steps S1 to S3, S6, and S7, and negative in steps S4 and S5, the dimming determination portion 110 determines whether or not time counted by an unillustrated timer has reached a fixed time. Hence, in step S8, the dimming determination portion 110 determines whether or not the motorcycle 10 is left untouched for a fixed time period. Note that the timer may start counting when the display surface 118 of the liquid crystal panel 78 starts its normal display state, for example.

Meanwhile, if the result is negative in the determination processes in steps S1 to S3, S6, and S7, or positive in steps S4 and S5, that is, if it is determined in step S1 that a predetermined vehicle speed is detected, for example, the dimming determination portion 110 determines that the rider is mounting the motorcycle 10 and traveling, and resets the timer in the next step S10.

In the next step S11, the dimming determination portion 110 determines that the rider may view the display contents of the liquid crystal panel 78, and stops outputting the dimming signals to stop dimming the display. Note that the process in step S11 is performed even if the time counted by the timer does not reach the fixed time in step S8.

Figure 6:
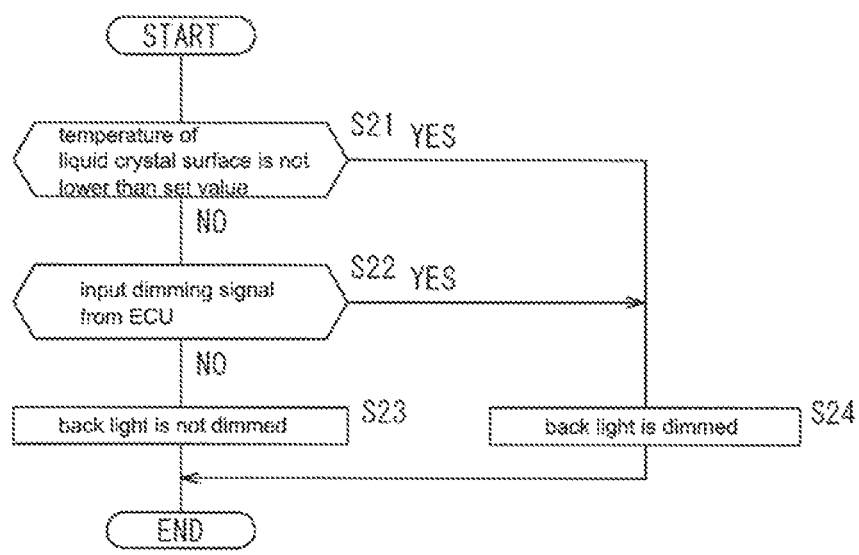
FIG. 6 is a flow chart showing dimming operations of the liquid crystal display device of FIG. 3.

FIG. 6 is a flowchart showing processes on the liquid crystal display device 28 side.

If the result is negative in both of the determination processes in steps S21 and S22, in the next step S23, the display device control unit 114 maintains the light amount of back light outputted from the back light source 116, and maintains the normal display state in which the display surface 118 of the liquid crystal panel 78 is displayed with a predetermined luminance.

Meanwhile, if the result is positive in any of the determination processes in steps S21 and S22, in the next step S24, the display device control means 114 changes the display surface 118 to the dimmed display state by switching the back light source 116 to the low output state, where the light amount of back light outputted therefrom is reduced.

The determination processes in steps S21 and S22 are as follows.

In step S21, the display device control unit 114 determines whether or not the temperature of liquid crystal detected by the liquid crystal temperature sensor 112 is not lower than the predetermined set value. In step S22, the display device control unit 114 determines whether or not a dimming signal is inputted from the dimming determination portion 110.

Specifically, the display device control unit 114 maintains the normal display state of the liquid crystal panel 78 when the temperature of liquid crystal is low and there is no input of the dimming signal, and on the other hand, changes the display surface 118 to the dimmed display state when the temperature of liquid crystal is relatively high, or a dimming signal is inputted, to protect the liquid crystal from heat caused by sunlight as well as heat generated by the back light source 116 itself when outputting the back light.

As has been described, according to the motorcycle 10 of the embodiment, the display surface 118 of the liquid crystal panel 78 is changed to the dimmed display state by switching the back light source 116 to the low output state, if the rider does not input operation to the control members which affect a state of the motorcycle 10 for a fixed time period. On the other hand, output of the back light source 116 is resumed if the rider operates such control members when the back light source 116 is in the low output state.

This configuration can desirably suppress both a temperature rise in the liquid crystal panel 78 and power consumption of the liquid crystal display device 28. Additionally, since the embodiment does not require a separate, dedicated controller for selecting an output state of the back light source 116, the rider is not required to search for any such controller. Moreover, detection of the rider's operation of the control members relating to a state of the motorcycle makes it easier to detect the rider's intention on riding the motorcycle 10, and thus output of the back light source 116 can be promptly resumed to that of the normal display state from that of the dimmed display state.

Additionally, when the rider rides the motorcycle 10, the rider rarely checks the display contents of the display surface 118 of the liquid crystal panel 78 when he/she operates a control member that is not directly related to the display contents. Hence, the back light source 116 is maintained in the low output state in such a case, so that power consumption and heat generation in the liquid crystal display device 28 can be suppressed effectively.

Moreover, since the gyro sensor 100 and the G sensor 102 constituting the acceleration sensor 104 detect changes in acceleration such as a posture change of the vehicle body when the rider mounts the motorcycle 10, the rider's intention on riding the motorcycle can be detected promptly. Thus, output of the back light source 116 can be promptly resumed to that of the normal display state from that of the dimmed display state without requiring the rider's operation of a control member.

Furthermore, when the rider mounts the motorcycle 10, in many cases, he/she mounts it from the side. For this reason, the rider's intention can be detected efficiently by detecting acceleration in the lateral direction through detection of rotational acceleration in the roll axis direction by the gyro sensor 100, or detection of acceleration in the vehicle width direction by the G sensor 102.

In addition, the engine 32 is likely to vibrate in the radial direction of the crankshaft 30, which is its main shaft, when the crankshaft 30 rotates, and on the other hand, is not likely to vibrate in the longitudinal direction of the main shaft. Accordingly, by arranging the crankshaft 30 of the engine 32 in the vehicle width direction of the motorcycle 10, the detection threshold of rotational acceleration in the roll axis direction detected by the gyro sensor 100 and of acceleration in the crosswise direction detected by the G sensor 102 can be lowered. As a result, sensitivity of the acceleration sensor 104 configured of the gyro sensor 100 and the G sensor 102 can be improved.

Moreover, if the acceleration sensor 104 is also used as a sensor used for theft prevention or slip ratio control of the motorcycle 10, use of the acceleration sensor 104 for purposes of controlling the output state of the back light source 116 eliminates the need for providing a separate, dedicated acceleration sensor for promptly resuming output of the back light source 116.

Note that in the display surface 118 of the exemplary embodiment, in the normal display state in FIG. 4A, display contents are displayed in a color having low optical transmittance, such as red, blue, and black, while the background portion is displayed in white. On the other hand, in the dimmed display state in FIG. 4B, display contents and the background portion are displayed in a color having low optical transmittance, such as gray or black.

Figure 7A:
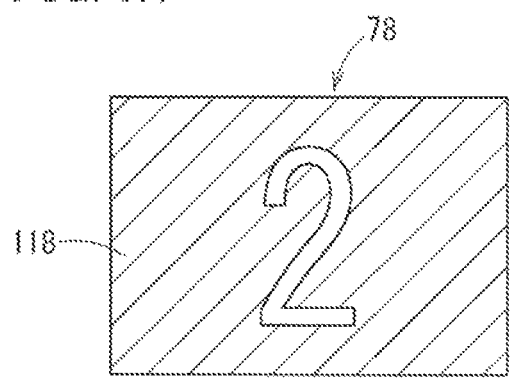
FIGS. 7A and 7B are explanatory views conceptually showing another exemplary embodiment of the normal display state and dimmed display state of the display surface of the liquid crystal display device according to the present invention.
Figure 7B:
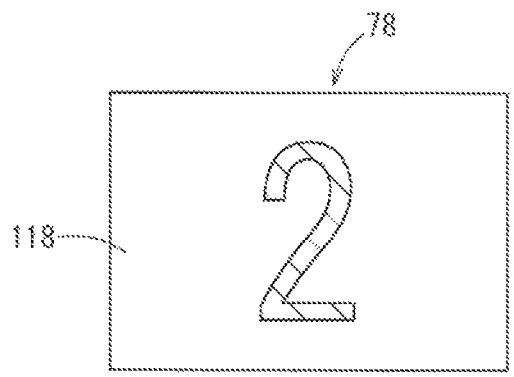

Incidentally, the display surface 118 may use a display form shown in FIGS. 7A and 7B. That is, according to the rider's selection, the normal display state may be shown as in FIG. 7A, where display contents are displayed in white while the background portion is displayed in a color having low optical transmittance, such as gray or black, and on the other hand, the dimmed display state may be shown as in FIG. 7B, where display contents are displayed in a color having low optical transmittance, such as gray or black, while the background portion is displayed in white. In other words, the dimmed display state in FIG. 7B is a negative display state of the normal display state in FIG. 7A, which is displayed in inverted colors.

Additionally, since the motorcycle 10 of the exemplary embodiment does not travel without the rider's operation of one or more of the control members that affect the state of the motorcycle, the display surface 118 may be blacked out by turning off the back light source 116 in such a state. In contrast, during travel, there is possibility that the rider may view display contents of the display surface 118, and thus the light amount of back light from the back light source 116 may be adjusted to the minimum necessary luminance for viewing the display contents. That is, when showing the dimmed display state in the embodiment, the light amount of back light can be varied according to the state of the motorcycle 10.

Figure 8:
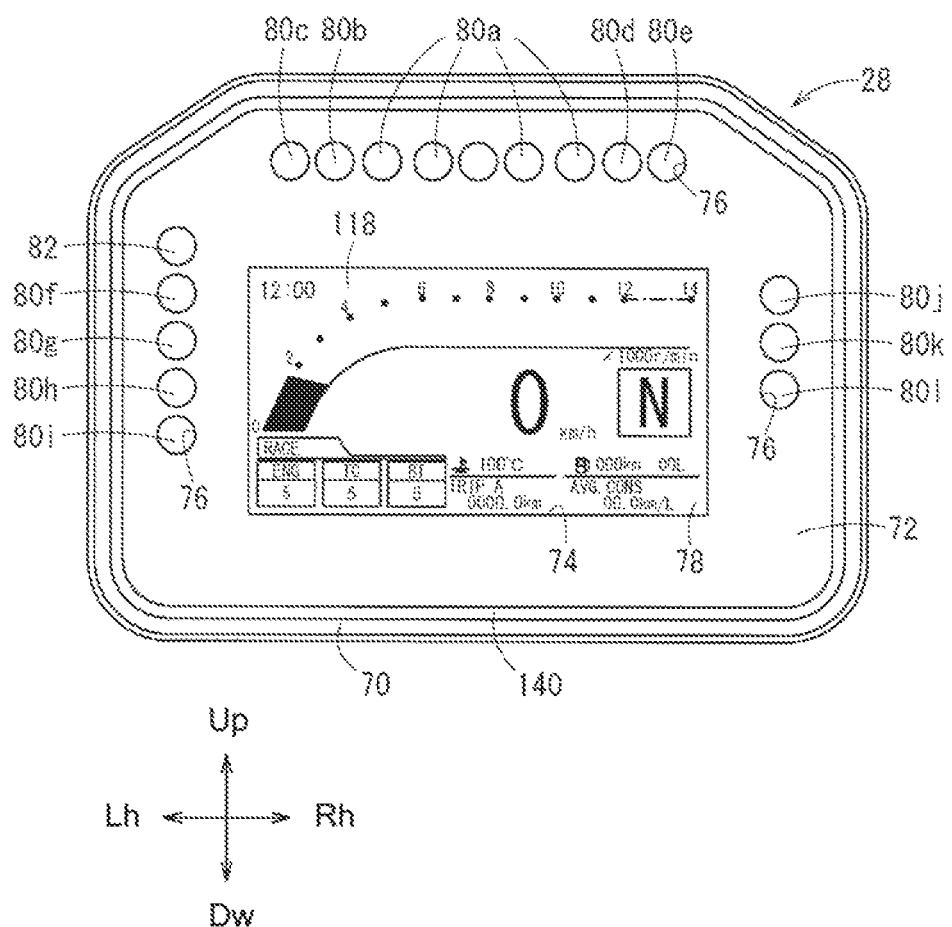
FIG. 8 is a front view of a liquid crystal display device in a modified example of the embodiment of FIG. 2.

Further, in a modification to the exemplary embodiment, as shown in FIG. 8, an annular light guiding member-luminous portion 140, which is controlled by the display device control unit 114 to guide light from an unillustrated light source and emit light, may be further provided outside the lens 72 in the cover member 70 of the liquid crystal display device 28.

In this case, as shown in FIG. 9, when the rider turns on an ignition switch at time point t0, the display surface 118 of the liquid crystal panel 78 gradually lightens by irradiation of back light from the back light source 116, and the light guiding member-luminous portion 140 also gradually lightens by light from the aforementioned light source, during a time period from time point t0 to time point t1.

After a time point t1 when the display surface 118 reaches a predetermined brightness and the brightness is maintained, the light guiding member-luminous portion 140 reaches a predetermined brightness when a time T1 passes from time point t1. Then, the brightness of the light guiding member-luminous portion 140 gradually decreases to 0 during time T2, and then gradually resumes the predetermined brightness during time T3. Thereafter, the light guiding member-luminous portion 140 continuously flashes in time (T2+T3) cycles until the rider starts the engine 32 by operating the starter switch 90 at time point t2. When the engine 32 is started at time point t2, the brightness of the light guiding member-luminous portion 140 once decreases to 0, and then gradually lightens during a time period from time point t2 to time point t3. After reaching a predetermined brightness at time point t3, the light guiding member-luminous portion 140 thereafter maintains the predetermined brightness.

Note that although in the above description display colors of the display surface 118 are described by use of specific colors, such as red, blue, gray, black, and white, any color may be used as long as optical transmittance of the entire screen can be changed from high transmittance to low transmittance between the normal and dimmed display states. In addition, lightness may be varied in the same hue to lower optical transmittance, for example, or different hues may be used for lower optical transmittance.

Although the present invention has been described by use of a present exemplary embodiment and a modification thereof, the technical scope of the present invention as set forth in the appended claims is not limited to the scope of description of the exemplary embodiment and the modification thereto. It is understood by those skilled in the art that various modifications or improvements can be made in the above exemplary embodiment and modification, and that such modified or improved modes are also included in the technical scope of the claimed invention.

| Description of Reference Numerals | |
|---|---|
| 10 motorcycle | 24L, 24R handle grip |
| 28 liquid crystal display device | 30 crankshaft |
| 32 engine | 44 side stand |
| 78 liquid crystal panel | 84 ECU or main controller |
| 86 selection switch | 88 setting switch |
| 90 starter switch | 92 engine stop switch |
| 94 wheel speed sensor | 96 shift position sensor |
| 98 throttle sensor | 100 gyro sensor |
| 102 G sensor | 104 acceleration sensor |
| 106 clutch switch | 108 side stand switch |
| 110 dimming determination portion | 112 liquid crystal temperature sensor |
| 114 display device control unit or sub-controller | 116 back light source |
| 118 display surface | 120 revolution indicator |
| 122 vehicle speed indicator | 124 shift position indicator |
| 126 water temperature indicator | 128 fuel indicator |
| 130 distance indicator | 132 fuel consumption indicator |
| 134a-134c output response indicator | |
| 140 light guiding member-luminous portion | |

What is claimed is:

1. A straddle type vehicle comprising:
a liquid crystal display device including a liquid crystal panel and a back light source arranged on a rear side of a display surface of the liquid crystal panel;
a main controller which receives predetermined inputs pertaining to a current operating state of the vehicle or to a rider's intended operations of the vehicle; and
a sub-controller for controlling said liquid crystal panel and said back light source;
wherein said sub-controller is configured to
switch the back light source from a normal output state to a low output state when the main controller determines that the vehicle is idle, and
switch the back light source back to the normal output state if the main controller determines that the vehicle is not idle; and
wherein the main controller is configured to determine that the vehicle is idle when, for at least a predetermined time period, a vehicle speed is 0 km/s and a shift position is neutral and a throttle value opening amount is 0 and there is no input from a starter switch and there is no input from an engine stop switch and a gyro signal is maintained in a constant range and an input from an acceleration sensor is maintained in a constant range.

2. The straddle type vehicle according to claim 1, wherein said predetermined inputs are directly related to display contents of the display surface of said liquid crystal panel.

3. The straddle type vehicle according to claim 1, wherein:
said sub-controller is also configured to switch said back light source to the normal output state if an acceleration change of not less than a predetermined value is detected by said acceleration sensor when said back light source is in the low output state.

4. The straddle type vehicle according to claim 2, wherein:
said sub-controller is also configured to switch said back light source to the normal output state if an acceleration change of not less than a predetermined value is detected by said acceleration sensor when said back light source is in the low output state.

5. The straddle type vehicle according to claim 3, wherein said sub-controller is also configured to switch said back light source to the normal output state if said acceleration sensor detects at least acceleration in the crosswise direction or rotational acceleration in the roll axis direction of said straddle type vehicle when said back light source is in the low output state.

6. The straddle type vehicle according to claim 4, wherein said sub-controller is also configured to switch said back light source to the normal output state if said acceleration sensor detects at least acceleration in the crosswise direction or rotational acceleration in the roll axis direction of said straddle type vehicle when said back light source is in the low output state.

7. The straddle type vehicle according to claim 5, wherein said straddle type vehicle further comprises a prime mover including a main shaft disposed in the vehicle width direction.

8. The straddle type vehicle according to claim 6, wherein said straddle type vehicle further comprises a prime mover including a main shaft disposed in the vehicle width direction.

9. The straddle type vehicle according to claim 3, wherein said acceleration sensor is also used for theft prevention or slip ratio control of said straddle type vehicle.

10. The straddle type vehicle according to claim 5, wherein said acceleration sensor is also used for theft prevention or slip ratio control of said straddle type vehicle.

11. The straddle type vehicle according to claim 7, wherein said acceleration sensor is also used for theft prevention or slip ratio control of said straddle type vehicle.

12. The straddle type vehicle according to claim 1, wherein the liquid crystal display device further includes a liquid crystal temperature sensor which detects a temperature of the liquid crystal display panel, and the sub-controller is also configured to switch the back light source from the normal output state to the low output state if the detected temperature of the liquid crystal display panel is not less than a predetermined value.

13. A straddle type vehicle comprising
a liquid crystal display device including a liquid crystal panel, and a back light source arranged on the rear side of a display surface of the liquid crystal panel, wherein:
said straddle type vehicle further comprises liquid crystal display device control means for controlling said liquid crystal panel and said back light source;
said liquid crystal display device control means is configured to
switch said back light source to a low output state when a dimming determination means determines that the vehicle is idle, and
resume output of said back light source if the dimming determination means determines that the vehicle is not idle; and
said dimming determination means determines that the vehicle is idle when, for at least a predetermined time period, a vehicle speed is 0 km/s and a shift position is neutral and a throttle value opening amount is 0 and there is no input from a starter switch and there is no input from an engine stop switch and a gyro signal is maintained in a constant range and an input from an acceleration sensor is maintained in a constant range.

14. The straddle type vehicle according to claim 13, wherein
said controller is configured to directly control display contents of the display surface of said liquid crystal panel.

15. The straddle type vehicle according to claim 13, wherein:
said liquid crystal display device control means is configured to resume output of said back light source, if an acceleration change of not less than a predetermined value is inputted to said acceleration sensor when said back light source is in the low output state.

16. The straddle type vehicle according to claim 15, wherein
said liquid crystal display device control means is configured to resume output of said back light source, if said acceleration sensor detects at least acceleration in the crosswise direction or rotational acceleration in the roll axis direction of said straddle type vehicle when said back light source is in the low output state.

17. The straddle type vehicle according to claim 16, wherein
said straddle type vehicle further comprises a prime mover including a main shaft disposed in the vehicle width direction.

18. The straddle type vehicle according to claim 15, wherein
said acceleration sensor is an acceleration sensor used for theft prevention or slip ratio control of said straddle type vehicle.

* * * * *